United States Patent [19]

Gifford

[11] Patent Number: 5,327,494
[45] Date of Patent: Jul. 5, 1994

[54] DIAL TONE ANNUNCIATING SYSTEM AND METHOD

[76] Inventor: Henry Gifford, 230 Riverside Dr. #11C, New York, N.Y. 10025-6172

[21] Appl. No.: 120,946

[22] Filed: Sep. 14, 1993

[51] Int. Cl.$^5$ .............................................. H04M 1/00
[52] U.S. Cl. .................................... 379/387; 379/386; 379/372; 379/354; 379/359; 379/355; 379/52; 379/395; 379/396
[58] Field of Search ............... 379/387, 372, 386, 354, 379/69, 359, 355, 52, 395, 396

[56] References Cited

U.S. PATENT DOCUMENTS 4,426,555  1/1984  Underkoffler ........................ 379/52
4,887,294  12/1989  Ruey-Gang ........................ 379/355

Primary Examiner—James L. Dwyer
Assistant Examiner—J. M. Saint-Surin
Attorney, Agent, or Firm—Brumbaugh, Graves, Donohue & Raymond

[57] ABSTRACT

Dial tone detection circuitry is employed in a telephone of the type which has its dialing mechanism incorporated into the handset. The dial tone detection circuitry is connected to an annunciating means which indicates to a user that dial tone is present without the need to bring the handset to the user's ear. The dial tone detection circuitry my also be connected to the telephone's automatic redial circuitry to ensure efficient operation of the redial function.

10 Claims, 1 Drawing Sheet

DIAL TONE ANNUNCIATING SYSTEM AND METHOD

BACKGROUND OF THE INVENTION

The present invention relates generally to telephones and specifically to an apparatus for detecting and annunciating the presence of a dial tone.

Telephones featuring their dialing apparatus located on the handset have recently become commonplace. Operation of such an apparatus requires the user to first bring the headset into viewing position to operate an on/off switch, second bring the handset to the ear for auditory detection of a dial tone, and third remove the handset to a distance at which the dialing controls can be viewed and manipulated. This sequence becomes particularly inconvenient in cases where the user repeatedly terminates a first phone call with the handset controls, and returns the handset to the ear for dial tone detection before returning the handset to viewing distance for dialing the next call.

Another source of delay related to ensuring the presence of a dial tone occurs in telephones having an "automatic redial" feature. An automatic redial feature is circuitry that remembers the last number dialed and redials it at the push of one button saving the user from having to redial all the digits of the telephone number.

This feature frequently incorporates a time delay after an on-hook/off-hook sequence to accommodate the requirement that dialing begin only after a dial tone has been established. This time delay often results in waiting longer than is necessary to ensure the presence of a dial tone and in some instances still might not prevent dialing prior to the presence of a dial tone.

SUMMARY OF THE INVENTION

A solution is proposed wherein dial tone detection circuitry is used in combination with an annunciating means such as a light on the keypad which informs the user there is a dial tone on the line. Thus, the user could simply look at the light and start dialing when the presence of a dial tone is indicated without having to bring the handset to his or her ear, repeatedly saving small but significant amounts of time. The dial tone detection circuitry is also incorporated into the automatic redial feature, rather than a time delay, to ensure that dialing commences no later than is necessary and only when a dial tone is present.

DESCRIPTION OF THE DRAWINGS

Other objects, features and advantages of the invention will become apparent, and its construction and operation better understood, from the following detailed description when read in conjunction with the following drawings in which.

DETAILED DESCRIPTION OF THE PREFERRED EMBODIMENTS

Figure 1:
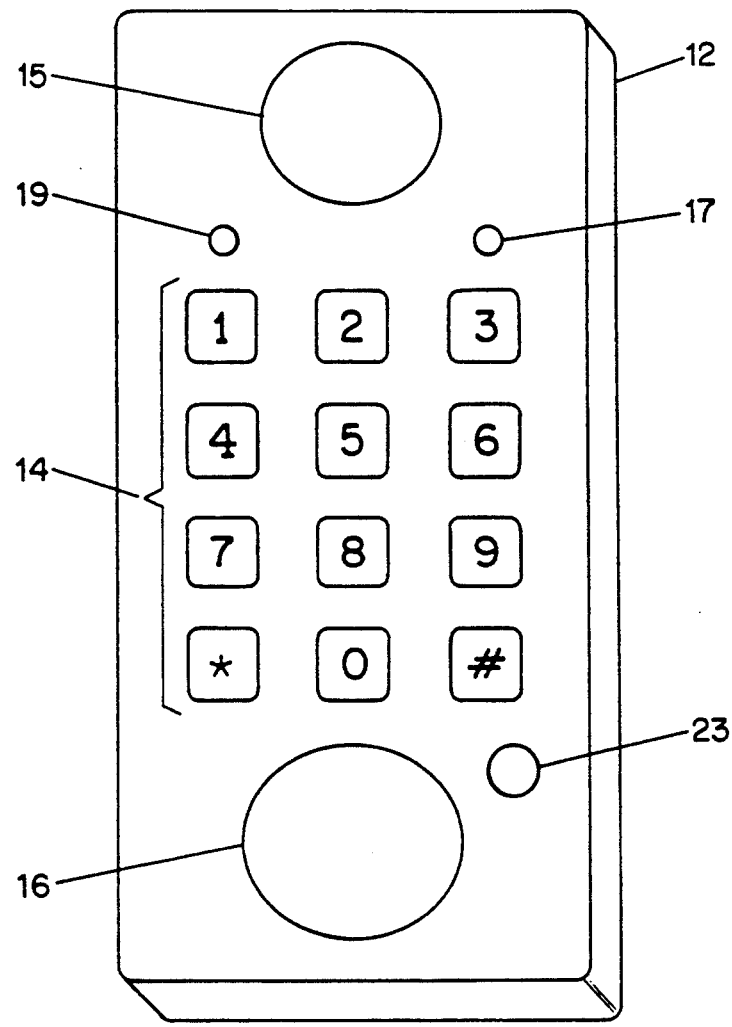
FIG. 1 is an illustration of a telephone handset keypad incorporating an annunciating light in accordance with the invention.

FIG. 1 is an illustration of a telephone handset 12 incorporating the invention. The prior art keypad 14, automatic redial button 23, speaker 15 and microphone 16 are all familiar components of telephone handsets in common use today of both the directly wired type and the type incorporating radio communication between the handset and a nearby base.

The connection annunciating light 17 is common on the type of telephones that communicate by radio waves with a nearby base (not shown) that is hard wired into the telephone system. This connection annunciating light 17 annunciates the establishment of radio connection between the handset 12 and the base, but does not indicate the presence of a dial tone. Therefore, it is not of much use to the telephone user, and potentially confusing.

The dial tone annunciating light 19 of the present invention is positioned so as to be visible while the user is viewing the keypad 14 for purposes of using the keypad 14.

Figure 2:
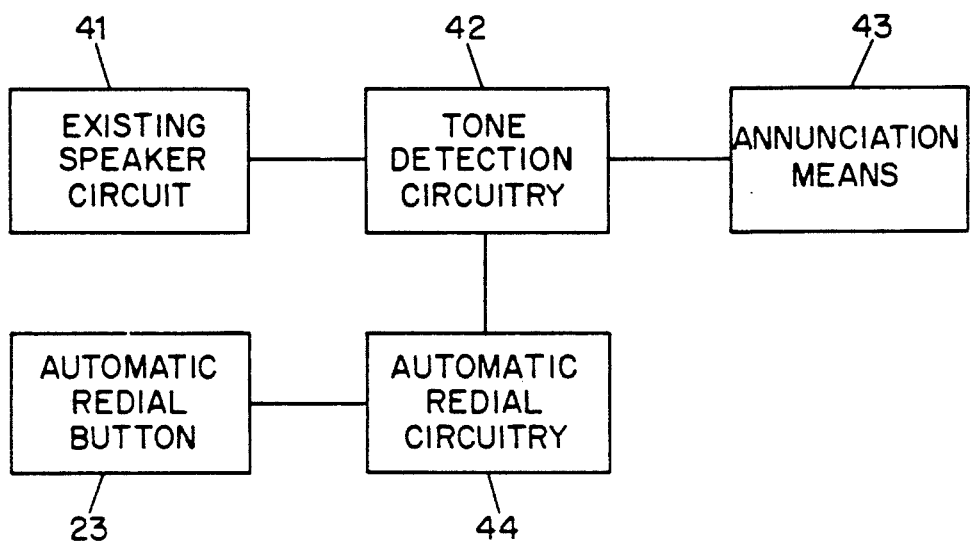
FIG. 2 is a schematic illustration of the circuitry of the invention.

FIG. 2 shows the circuitry used in this embodiment to operate the dial tone annunciating light 19. Dial tone detection circuitry 42 is connected to the existing telephone circuitry in a manner permitting it to receive dial tone signals from the phone line. In this embodiment, the dial tone is detected at the speaker circuitry 41 which emits the dial tone heard by the user. A modern dial tone is a multi-frequency (DTMF) signal consisting of a 350 Hz and a 440 Hz signal and, therefore, the preferred embodiment of the present invention would detect this tone. Any one of a number of known frequency detection circuits may be used.

Any time the dial tone detection circuitry 42 detects the presence of a dial tone, it switches on the dial tone annunciating means 43, which in this embodiment is a light 19 on the handset 12. The tone detection circuitry 42 also sends automatic redial circuitry 44 a signal indicating a dial tone is present. The user can see the light and begin dialing without having to bring the handset to the ear. Furthermore, any time the telephone user uses the automatic redial feature by pressing the redial button 23 the automatic redial circuitry 44 causes an on hook/off hook sequence and looks to see if a dial tone is present. If a dial tone is present, the dialing sequence is initiated without delay. If a dial tone is not present the redial circuitry waits until tone detection circuitry 42 indicates the presence of a dial tone. Once the presence of a dial tone is indicated to the redial circuitry, automatic redialing is initiated immediately, thereby eliminating the above-mentioned problems associated with the redial circuits employing a fixed time delay.

While the above is a description of the invention in its preferred embodiment, various modifications, alternate constructions and equivalents may be employed. For example, alternative annunciating means such as a vibratory stimulus or an auditory stimulus which can be heard without bringing the handset to the ear may be used without departing from the scope of this invention. Therefore, the above description and illustration should not be taken as limiting the scope of the invention which is defined by the appended claims.

I claim:

1. A telephone consisting essentially of:
   a handset;
   means for dialing incorporated into the handset;
   means for detecting a dial tone; and
   means, incorporated into the handset, for annunciating a detection of a dial tone in a manner which does not require a user to bring the handset to the user's ear to determine whether a dial tone is present.

2. The improved telephone of claim 1 wherein the means for annunciating comprises a visual stimulus.

3. The improved telephone of claim 1 wherein the means for annunciating comprises a vibratory stimulus.

4. The improved telephone of claim 1 wherein the means for annunciating comprises an auditory stimulus.

5. A method of alerting a telephone user to the presence of a dial tone comprising the steps of:
   providing a telephone having a handset and, incorporated into the handset, a mans for annunciating a dial tone and a means for dialing;
   detecting a dial tone; and
   annunciating a detection of a dial tone in a manner which does not require the user to bring the handset to the user's ear to determine whether a dial tone is present.

6. The method of claim 5 wherein the annunciating is performed by a visual stimulus.

7. A method of claim 5 wherein the annunciating is performed by a vibratory stimulus.

8. A method of claim 5 wherein the annunciating is performed by an auditory stimulus.

9. A telephone consisting essentially of:
   a handset;
   means for dialing incorporated into the handset;
   means for automatically redialing a previously dialed number;
   means for detecting a dial tone; and
   means for initiating an automatic redial only after a dial tone has been detected.

10. A method for improving the efficiency of a telephone automatic redial function comprising the steps of:
    providing a telephone comprising a handset, a means for dialing incorporated into the handset, an automatic redial button and means for detecting a dial tone;
    pressing the automatic redial button;
    detecting a dial tone; and
    initiating a redial only after the dial tone is detected.

* * * * *

UNITED STATES PATENT AND TRADEMARK OFFICE
CERTIFICATE OF CORRECTION

PATENT NO. : 5,327,494

DATED : July 5, 1994

INVENTOR(S) : Gifford

It is certified that error appears in the above-indentified patent and that said Letters Patent is hereby corrected as shown below:

<u>Col. 3, line 10</u>, "mans" should read --means--.--.

Signed and Sealed this

Seventh Day of February, 1995

Attest:

BRUCE LEHMAN

*Attesting Officer*     *Commissioner of Patents and Trademarks*